(12) United States Patent
Ooyama

(10) Patent No.: US 6,616,568 B2
(45) Date of Patent: Sep. 9, 2003

(54) TOROIDAL-TYPE CONTINUOUSLY VARIABLE TRANSMISSION

(75) Inventor: Kazuo Ooyama, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/965,847

(22) Filed: Oct. 1, 2001

(65) Prior Publication Data

US 2002/0039948 A1 Apr. 4, 2002

(30) Foreign Application Priority Data

Oct. 4, 2000 (JP) ........................................ 2000-304420

(51) Int. Cl.⁷ .............................................. F16H 15/38
(52) U.S. Cl. ........................................... 476/40; 476/42
(58) Field of Search ............................... 476/40, 41, 42, 476/45, 46

(56) References Cited

U.S. PATENT DOCUMENTS 5,971,885 A * 10/1999 Greenwood et al. ........... 476/8
6,440,034 B1 * 8/2002 Ishikawa et al. ............. 476/46
2002/0019289 A1 * 2/2002 Ishikawa ..................... 476/46
2002/0111247 A1 * 8/2002 Mori et al. .................... 476/46

FOREIGN PATENT DOCUMENTS

JP          10-331938          12/1998
JP         P2002-106667 A    * 10/2002

* cited by examiner

Primary Examiner—David Fenstermacher
(74) Attorney, Agent, or Firm—Armstrong, Westerman & Hattori, LLP

(57) ABSTRACT

The trunnion of the toroidal-type continuously variable transmission has a pair of journal portions disposed on a trunnion shaft and spaced from each other, a U-shaped eccentric portion disposed eccentric from the trunnion shaft and having two ends integrally connected to the mutually opposing end portions of the pair of journal portions, and a pivot shaft disposed in the eccentric portion for supporting a power roller in a space enclosed by the eccentric portion and the mutually opposing end portions of the pair of journal portions. The mutually opposing end portions of the pair of journal portions are connected together by a reinforcing member and the power roller is interposed between the eccentric portion of the trunnion and the reinforcing member, thereby being able to prevent the deformation of the trunnion due to a load applied thereto from the input and output disks through the power roller.

5 Claims, 9 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission in which an input disk is supported on a rotary shaft so as to be unrotatable with respect to the rotary shaft, an output disk is supported on the rotary shaft so as to be rotatable with respect to the rotary shaft, a trunnion, and a power roller rotatably supported on the trunnion in such a manner that it is contacted with the input and output disks.

2. Description of the Related Art

Conventionally, in such toroidal-type continuously variable transmission, in order to prevent the power roller against slippage with respect to the input and output disks, the input and output disks are energized in the mutually opposing directions by a torque cam mechanism or by an oil pressure cylinder to thereby generate a load which can be applied to the power roller. Here, as shown in FIG. 9, a trunnion 02 for supporting a power roller 01 is similar in shape to a crankshaft of a single cylinder engine, that is, the trunnion 02 has such a shape that it includes a pair of journal portions 03, 04 to be disposed on a trunnion shaft L and a U-shaped eccentric portion 05 for connecting together the two journal portions 03, 04; and, in the eccentric portion 05, there is formed an axial hole lo a for supporting the power roller 01. Therefore, in case where the trunnion 02 receives a load F from the input and output disks, it can be deformed into such a shape as shown by chained lines in FIG. 9, so that a piston 06 disposed on the end portion of one journal portion 04 can be inclined. In case where the piston 06 of the trunnion 02 is incline d in this manner, the piston 06 pries against a cylinder so that the trunnion 02 cannot be driven smoothly in the trunnion shaft L direction.

In view of t he above, in a toroidal-type continuously variable transmission disclosed in JP-A-10-331938, the rigidity of one journal portion held by and between the piston and eccentric portion of a trunnion is lowered and the lowered-rigidity portion is deformed to thereby prevent the piston against inclination.

However, as in the toroidal-type continuously variable transmission disclosed in JP-A-10-331938, to lower the rigidity of the journal portion of the trunnion is not desirable in securing the strength of the trunnion and, in addition to this, there is a possibility that the flexed trunnion can give rise to the lowered transmission response characteristic of a toroidal-type continuously variable transmission.

SUMMARY OF THE INVENTION

The present invention aims at eliminating the drawbacks found in the above-described conventional toroidal-type continuously variable transmission. Accordingly, it is an object of the invention to provide a toroidal-type continuously variable transmission which is simple in structure and can enhance the rigidity of a trunnion.

In attaining the above object, according to a first aspect of the invention, there is provided a toroidal-type continuously variable transmission, comprising: an input disk supported on a rotary shaft so as to be unrotatable with respect to the rotary shaft, an output disk supported on the rotary shaft so as to be rotatable with respect to the rotary shaft, a trunnion, and a power roller supported rotatably on the trunnion in such a manner that it is contacted with the input disk and output disk, the trunnion comprising a pair of journal portions disposed on a trunnion shaft and spaced from each other, a U-shaped eccentric portion disposed eccentric from the trunnion shaft and having two ends integrally connected to the mutually opposing end portions of the pair of journal portions, and a pivot shaft disposed in the eccentric portion for supporting the power roller in a space defined by the eccentric portion and the mutually opposing end portions of the pair of journal portions, wherein the trunnion is moved in the direction of the trunnion shaft and is rotated around the trunnion shaft to thereby shift the contact positions of the power roller with the input disk and output disk for transmission, wherein the mutually opposing end portions of the pair of journal portions are connected together by a reinforcing member, and the power roller is held by and between the eccentric portion of the trunnion and reinforcing member.

According to the above structure, the mutually opposing end portions of the pair of journal portions respectively connected to the two ends of the eccentric portion of the trunnion are connected together by the reinforcing member and are thereby enhanced in rigidity. Therefore, even in case where a load is applied from the input and output disks to the eccentric portion of the trunnion through the power roller, the deformation of the trunnion caused by the load can be controlled down to a minimum. Thanks to this, not only occurrence of frictional actions in the support portion and drive portion of the trunnion can be prevented, but also the movement of the trunnion in the trunnion shaft direction as well as the rotational movement thereof around the trunnion shaft can be carried out smoothly.

Also, according to a second aspect of the invention, there is provided a toroidal-type continuously variable transmission, in which, in addition to the structure according to the first aspect of the invention, oil passages for supplying lubricating oil, which is used to lubricate the contact portions of the input disk and output disk with the power roller, are formed in the reinforcing member.

According to the above structure, since the contact portions of the input disk and output disk with the power roller are lubricated with the lubricating oil that is supplied through the oil passages formed in the reinforcing member, the input disk, output disk, and power roller can be enhanced in durability.

By the way, an input shaft shown in an embodiment of the invention to be described later corresponds to the rotary shaft specified in the patent claim of the invention.

DETAILED DESCRIPTION OF THE PREFERRED EMBODIMENTS

Figure 1:
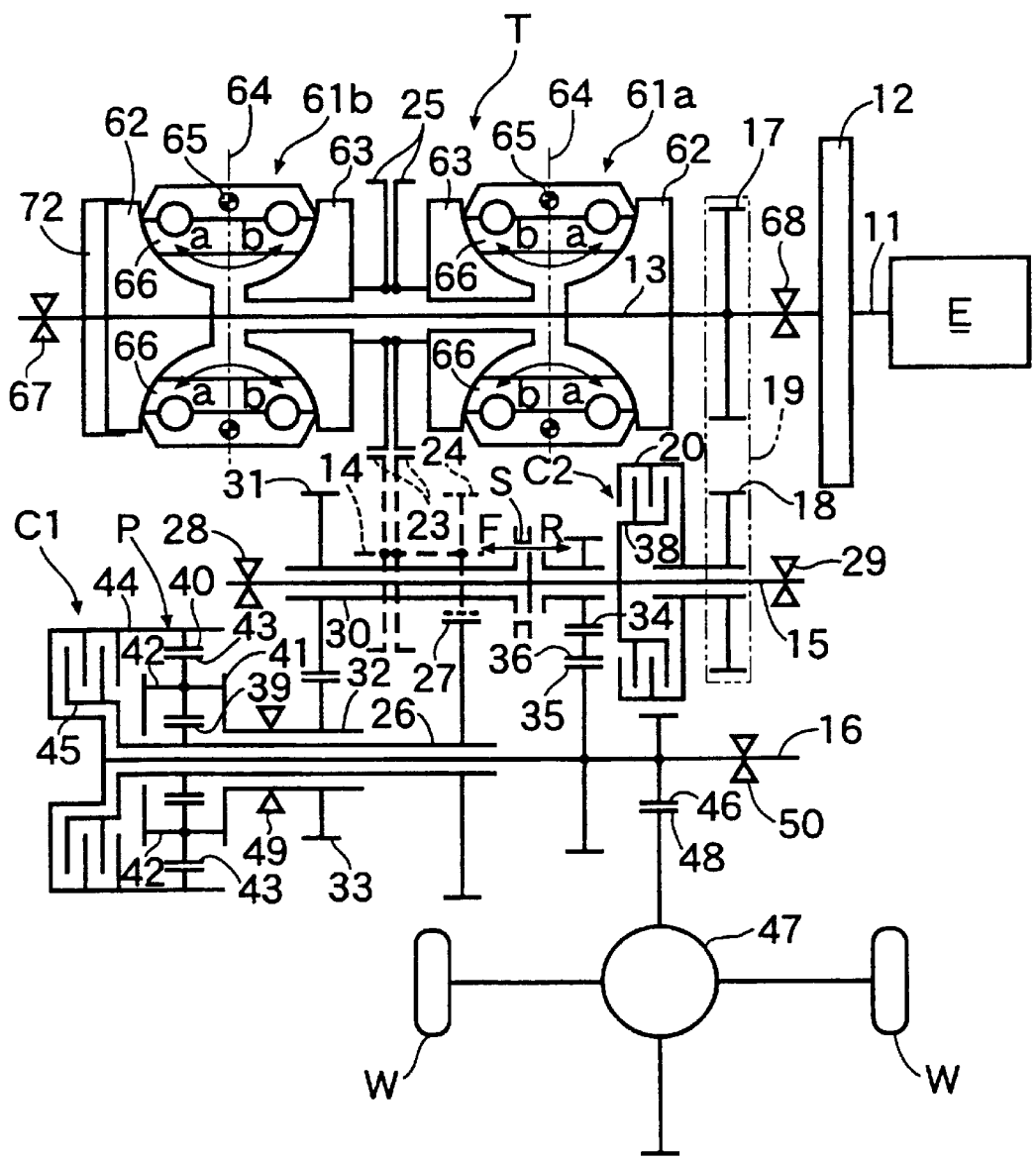
FIG. 1 is a skeleton view of a continuously variable transmission.
Figure 2:
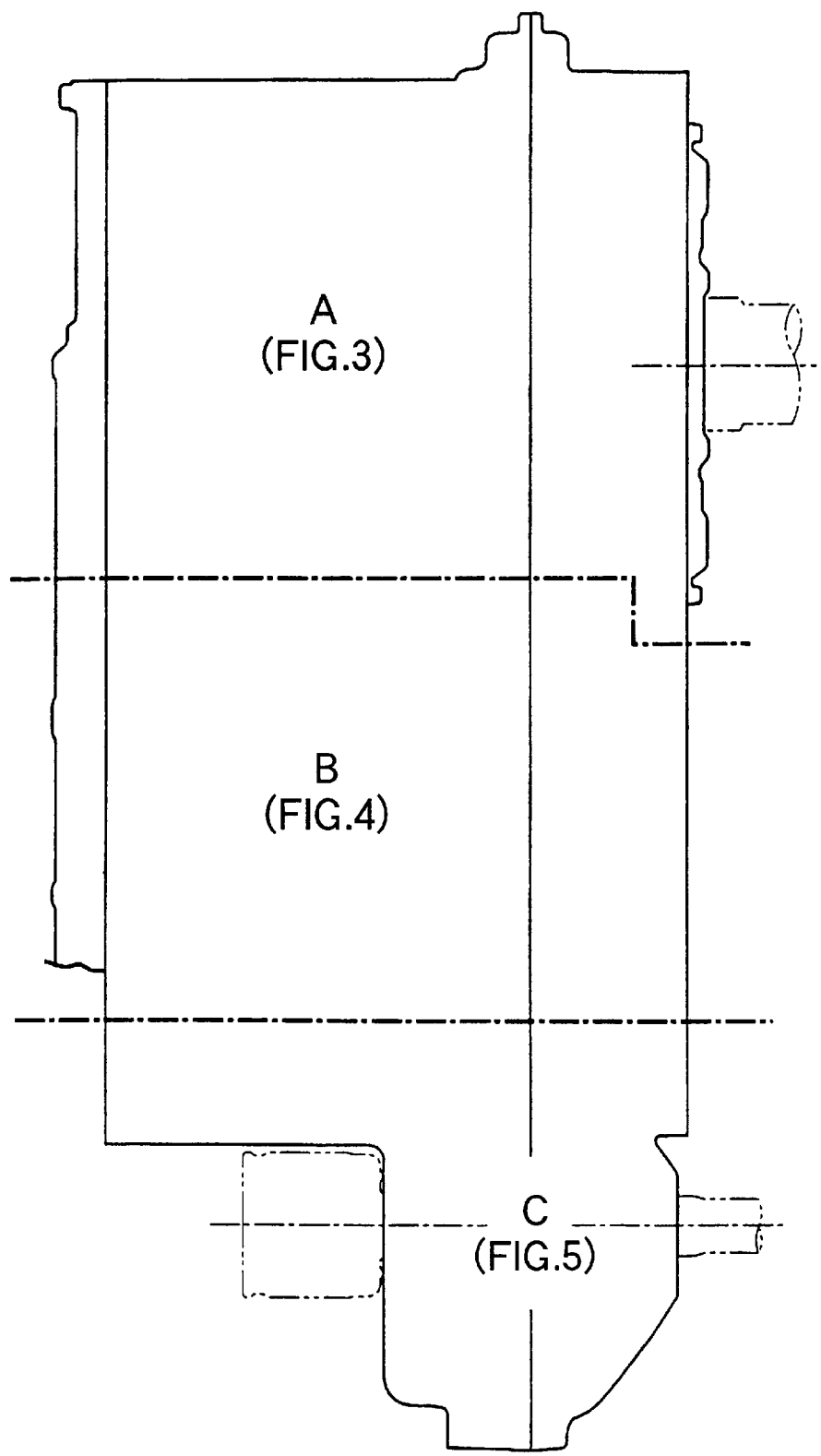
FIG. 2 is a map of the layouts of the above continuously variable transmission shown in FIGS. 3–5.

Now, description will be given below of a mode for carrying out the invention based on an embodiment of a toroidal-type continuously variable transmission according to the invention shown in the accompanying drawings.

FIGS. 1–8 show an embodiment of a toroidal-type continuously variable transmission according to the invention. As shown in FIG. 1 and FIGS. 3–5, a continuously variable transmission for a vehicle includes a toroidal-type continuously variable transmission T, a planetary gear mechanism P of a single pinion type, a forward start clutch C1 (which is hereinafter referred to as a first clutch C1) composed of a wet type clutch, and a backward start and torque split clutch C2 (which is hereinafter referred to as a second clutch C2) composed of a wet type clutch. A crankshaft 11 of an engine E is connected through a damper 12 to an input shaft 13 of the toroidal-type continuously variable transmission T. A first shaft 14, a second shaft 15 and a third shaft 16 are disposed respectively in parallel to the input shaft 13 of the toroidal-type continuously variable transmission T. The first clutch C1 is disposed on the left end portion of the third shaft 16, while the second clutch C1 is disposed on the right end portion of the second shaft 15. A drive sprocket 17, which is fixed to the input shaft 13 of the toroidal-type continuously variable transmission T, is connected by an endless chain 19 to a driven sprocket 18 supported on the right end portion of the second shaft 15, while the second shaft 15 and driven sprocket 18 are arranged so as to be rotatable with respect to each other. Therefore, the driven sprocket 18 on the second shaft 15 and a clutch outer 20 of the second clutch C2 formed integral with the driven sprocket 18 are normally allowed to rotate while the engine E is in operation.

To the first shaft 14 which is supported on a casing by a ball bearing 21 and a roller bearing 22, there are fixed a double helical gear 23 and a first helical gear 24; and, the double helical gear 23 is meshingly engaged with an output gear 25 which is provided in the toroidal-type, continuously variable transmission T and is composed of a similar double helical gear, while the first helical gear 24 is meshingly engaged with a second helical gear 27 fixed to a sleeve 26 which can be fitted with the third shaft 16 in such a manner that the sleeve 26 and the third shaft 16 can be rotated with respect to each other. To a sleeve 30 which can be mutually rotatably fitted with the second shaft 15 supported on the casing by a ball bearing 28 and a roller bearing 29, there is fixed a third helical gear 31, while the third helical gear 31 can be meshingly engaged with a fourth helical gear 33 fixed to a sleeve 32 which can be fitted with the outer periphery of the sleeve 26 of the third shaft 16 in such a manner that they can be rotated with respect to each other. A fifth helical gear 34 is supported on the second shaft 15 in such a manner that they can be rotated with respect to each other, while the fifth helical gear 34 can be meshingly engaged through a seventh helical gear 36 with a sixth helical gear 35 fixed to the third shaft 16. The seventh helical gear 36 is a reverse idle gear but is not shown in FIG. 4. The sleeve 30 (and thus the third helical gear 31) and fifth helical gear 34 can be selectively connected to the second shaft 15 by a shifter S. To the second shaft 15, there is fixed a clutch inner 38 of the second clutch C2 and, therefore, in case where the second clutch C2 is fastened, the driven sprocket 18 is connected to the second shaft 15.

A planetary gear mechanism P, which is disposed on the third shaft 16, includes a sun gear 39 fixed to the sleeve 26, a ring gear 40, and a plurality of pinions 43 which are rotatably supported through a plurality of pinion shafts 42 on a carrier 41 fixed to the sleeve 32 and can be meshingly engaged with the sun gear 39 and ring gear 40. The first clutch C1 comprises a clutch outer 44 formed integral with the ring gear 40 of the planetary gear mechanism P and the third shaft 16, and a clutch inner 45 formed integral with the sun gear 39 and sleeve 26. Therefore, in case where the first clutch C1 is fastened, the planetary gear mechanism P is locked, so that the third shaft 16 connected to the ring gear 40, the sleeve 26 connected to the sun gear 39 and the sleeve 32 connected to the carrier 41 can be connected together as a united body. A final drive gear 46, which is fixedly disposed on the right end of the third shaft 16, is meshingly engaged with a final driven gear 48 which is disposed on a differential gear 47. The third shaft 16 is supported on the casing by a ball bearing 49 disposed on the outer periphery of the sleeve 32 and a ball bearing 50 disposed on the outer periphery of the present third shaft 16.

Next, description will be given below of the structure of the toroidal-type continuously variable transmission T.

On the input shaft 13 of the toroidal-type continuously variable transmission T connected to the crankshaft 11 of the engine E through the damper 12, there are supported a first continuously variable transmission mechanism 61a and a second continuously variable transmission mechanism 61b which are substantially the same in structure. The first continuously variable transmission mechanism 61a includes a substantially-cone-shaped input disk 62 fixed to the input shaft 13, a substantially-cone-shaped output disk 63 rotatably supported on the input shaft 13, and a pair of power rollers 66 which are rotatably supported on their associated roller shafts 64, inclinably supported on their associated trunnion shafts 65, and can be contacted with the input disk 62 and output disk 63. Between the mutually opposing surfaces (which are respectively formed of toroidal curved surfaces) of the input and output disks 62 and 63, there are formed cavities in which the power rollers 66 can be stored. In case where the power rollers 66 are inclinedly rotated around their associated trunnion shafts the contact points of the power rollers 66 with respect to the input and output disks 62 and 63 are caused to vary.

The second continuously variable transmission mechanism 61b is disposed substantially surface symmetric with respect to the first continuously variable transmission mechanism 61a with the output gear 25 between them.

Thus, in case where the power rollers 66 are inclinedly rotated in the direction of an arrow mark a, the contact points of the power rollers 66 with the input disk 62 are moved with respect to the input shaft 13 outwardly in the radial direction thereof as well as the contact points of the power rollers 66 with the output disk 63 are moved with respect to the input shaft 13 inwardly in the radial direction thereof; and, therefore, the rotation speed of the input disk 62 is increased and the thus increased rotational movement of the input disk 62 is transmitted to the output disk 63, with the result that the ratio of the toroidal-type continuously variable transmission T is caused to vary toward the OD side continuously. On the other hand, in case where the power rollers 66 are inclinedly rotated in the direction of an arrow mark b, the contact points of the power rollers 66 with the input disk 62 are moved with respect to the input shaft 13 inwardly in the radial direction thereof as well as the contact points of the power rollers 66, 66 with the output disk 63 are moved with respect to the input shaft 13 outwardly in the radial direction thereof; and, therefore, the rotation speed of the input disk 62 is decreased and the thus decreased rotational movement of the input disk 62 is transmitted to the output disk 63, with the result that the ratio of the toroidal-type continuously variable transmission T is caused to vary toward the LOW side continuously.

Figure 3:
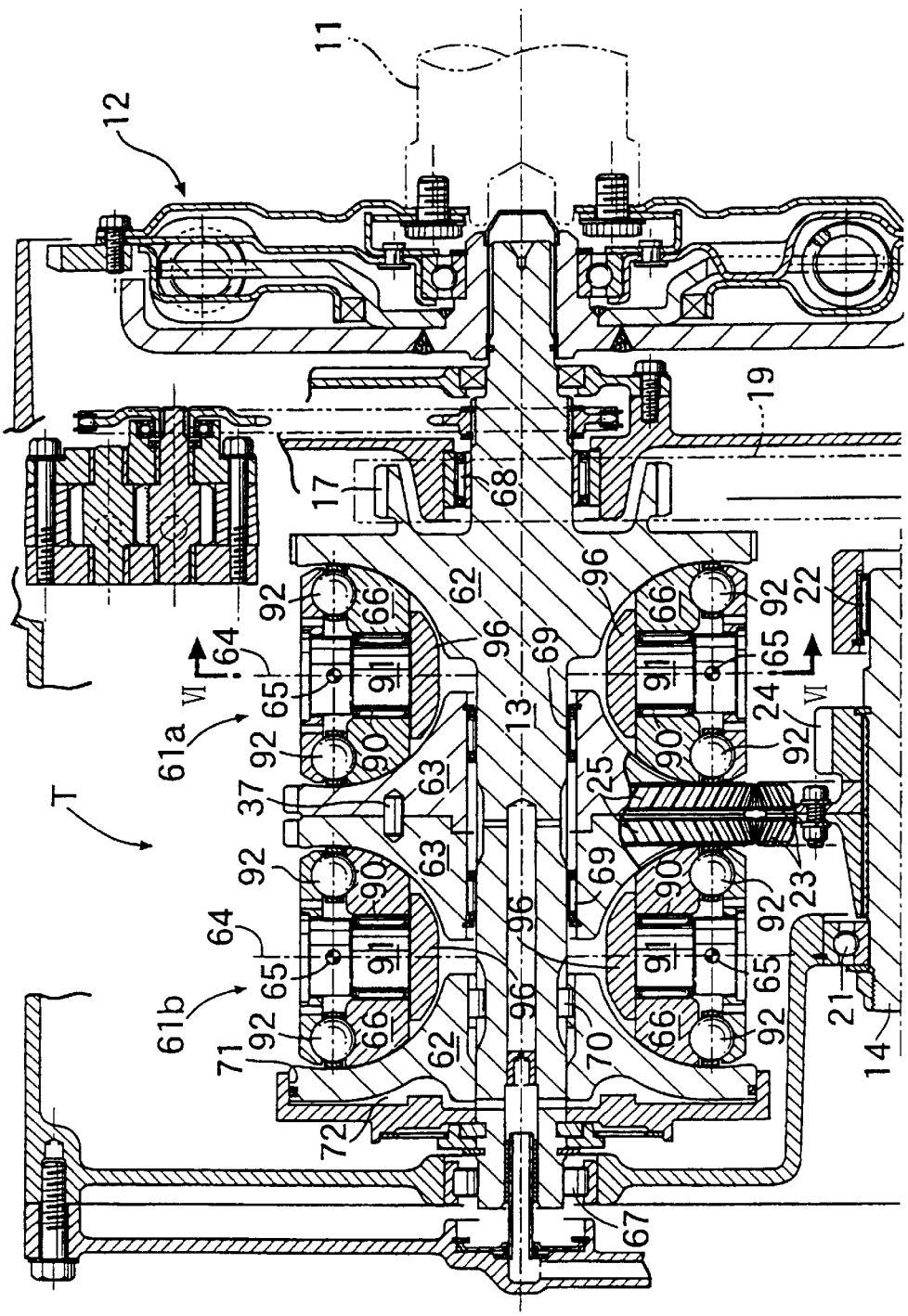
FIG. 3 is an enlarged view of the A part shown in FIG. 2.
Figure 4:
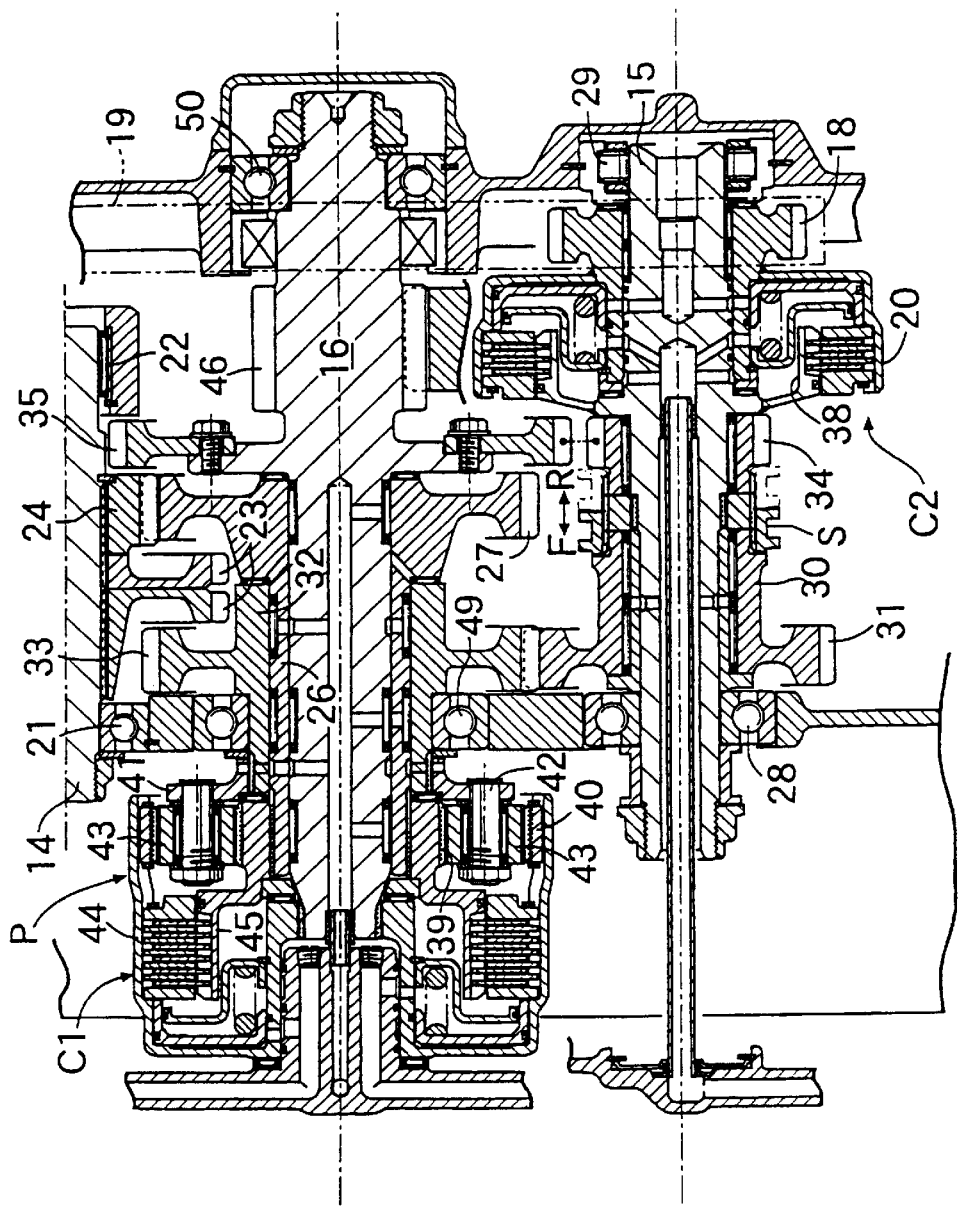
FIG. 4 is an enlarged view of the B part shown in FIG. 2.
Figure 5:
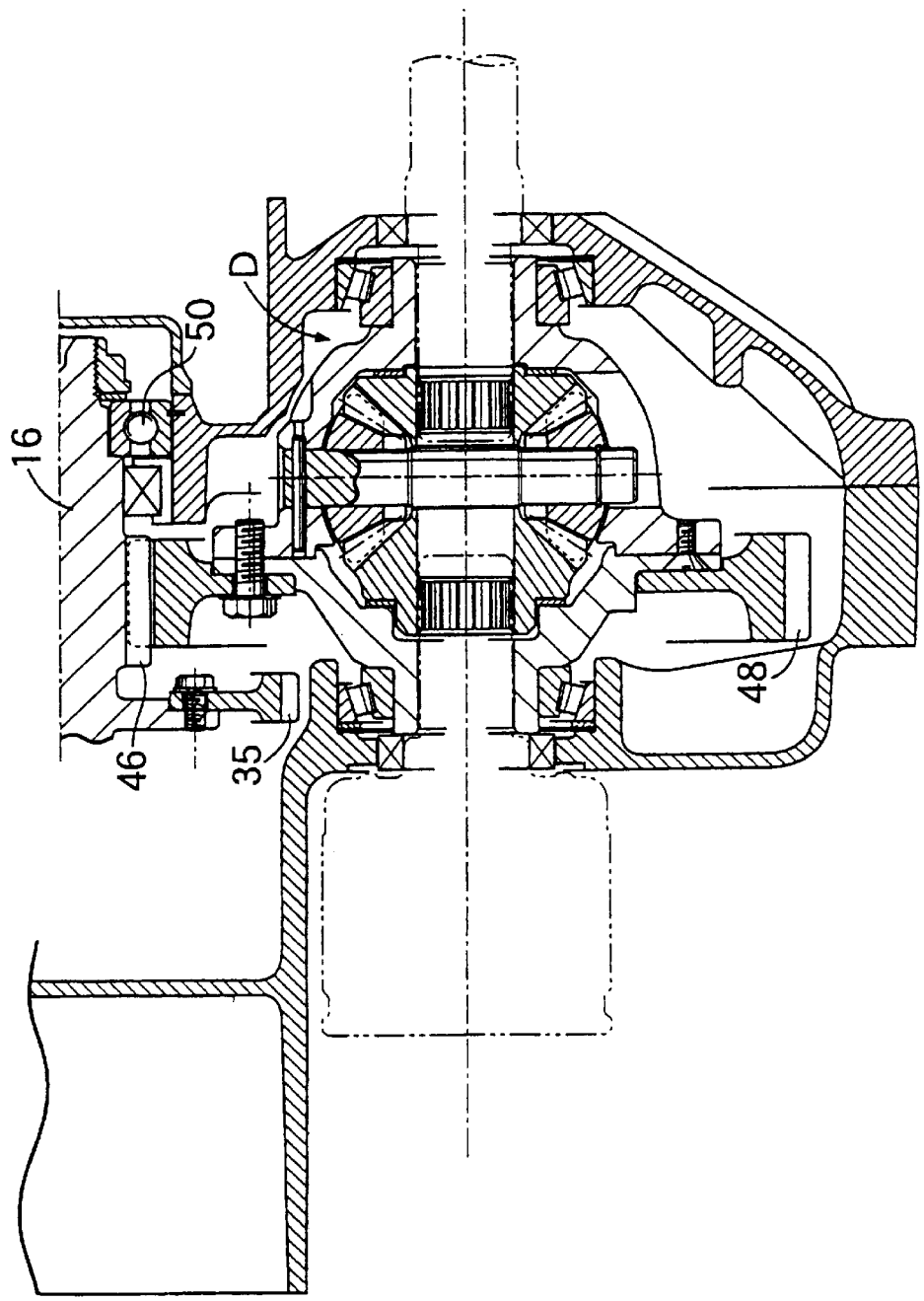
FIG. 5 is an enlarged view of the C part shown in FIG. 2.
Figure 6:
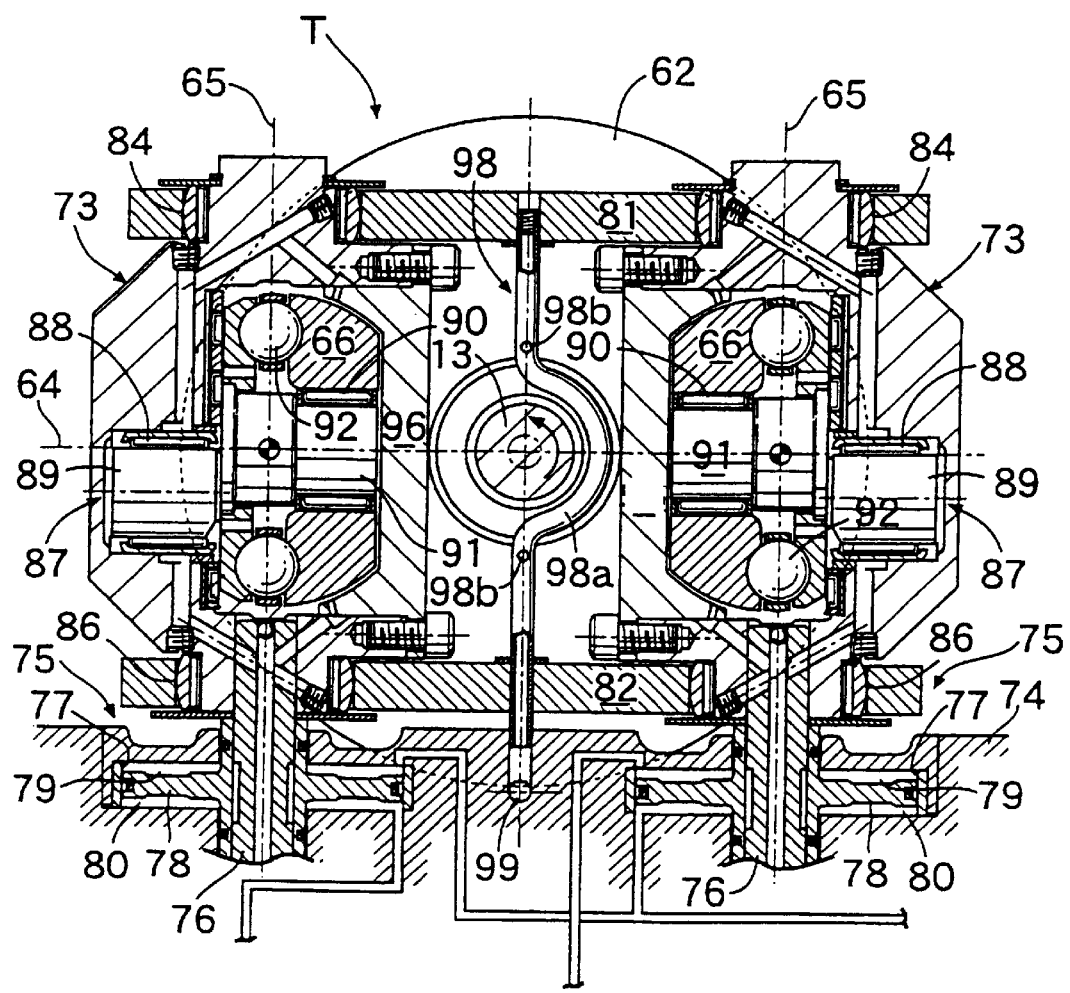
FIG. 6 is a section view taken along the line VI—VI shown in FIG. 3;.

Next, description will be given below further of the structure of the toroidal-type continuously variable transmission T with reference to FIG. 3 as well as FIGS. 6 to 8.

The input disk 62 of the first continuously variable transmission mechanism 61a is formed integral with the input shaft 13 which is supported on the casing by a pair of roller bearings 67, 68. Since the input shaft 13 is supported by the roller bearings 67, 68, it is not restricted in the axial direction with respect to the casing. The output disks 63 of the first and second continuously variable transmission mechanisms 61a, 61b are integrally connected to each other through a pin 37; and also, these output disks 63 are respectively supported on the input shaft 13 through their associated needle bearings 69 in such a manner that they can be rotated with respect to each other as well as can be slided in the axial direction. The output gears 25, which are respectively disposed on the outer peripheries of the pair of output disks 63, are each composed of a double helical gear the tooth groove of which has an angular shape, while the output gears 25 can be meshingly engaged with the double helical gears 23 formed on the first shaft 14. Since the first shaft 13 the left end of which is supported on the casing by the ball bearing 21 is restricted in such a manner that it cannot be moved in the axial direction, the output gear 25 to be meshingly engaged with the double helical gear 23 formed integral with the first shaft 13 can be positioned in the axial direction of the input shaft 13.

The input disk 62 of the second continuously variable transmission mechanism 61b is supported on the input shaft 13 through a roller spline 70 in such a manner that it cannot be rotated with respect to the input shaft 13 but can be slided in the axial direction of the input shaft 13. On the left end of the input shaft 13, there is disposed a cylinder 71 in such a manner that it is coaxial with the input shaft 13; and, between the interior portion of the cylinder 71 and the input disk 62 of the second continuously variable transmission mechanism 61b which can be slidably fitted with the cylinder 71, there is formed an oil chamber 72. Therefore, in case where oil pressure is supplied to the oil chamber 72, the input disk 62 of the second continuously-variable transmission mechanism 61b as well as the output disks 63 of the first and second continuously variable transmission mechanisms 61a, 61b are pressed toward the input disk 62 of the first continuously variable transmission mechanism 61a, thereby being able to generate a load which can prevent slippage between the input disks 62, output disks 63 and the power rollers 66.

A pair of right and left trunnions 73 supporting the pair of power rollers 66 are disposed in such a manner that they hold the input shaft 13 between them. Each of the two trunnions 73, which is formed similar in shape to a crankshaft of a single-cylinder engine, comprises a pair of journal portions 73a, 73b, which are disposed on the trunnion shaft 65 and are spaced from each other, and a U-shaped eccentric portion 73c for connecting together the mutually opposing end portions of the two journal portions 73a, 73b as a united body. A pair of actuators 75, which are disposed on an oil pressure control block 74, are respectively composed of: piston rods 76 respectively connected to the lower journal portions 73b of the trunnions 73; cylinders 77 disposed in the oil pressure control block 74; pistons 78 respectively fitted with the cylinders 77 and fixed to the piston rods 76; upper oil chambers 79 formed upwardly of the pistons 78; and, lower oil chambers 80 formed downwardly of the pistons 78.

The journal portions 73a, 73b of each trunnion 73 and piston rod 76 are disposed so as to be coaxial with the trunnion shaft 65 and, therefore, the trunnion 73 and piston rod 76 can be incliningly rotated around the trunnion shaft 65 with the journal portions 73, 73b as the support shafts thereof. Also, in case where oil pressure is supplied to the lower oil chamber 80 of one oil pressure actuator 75, then oil pressure is supplied to the upper oil chamber 79 of the other oil pressure actuator 75. Therefore, the right and left piston rods 76 are driven in the mutually opposite directions; and, in the case of the right and left trunnions 73, when one of them is moved upward along the trunnion shaft 65, the other is moved downward along the trunnion shaft 65. As a result of this, the power rollers 66 are rotated together with the trunnions 73 around their respective trunnion shafts 65 and thus the contact points of the power rollers 66 with the input disk 62 and output disk 63 are moved, so that the ratio of the toroidal-type continuously variable transmission T is caused to vary continuously.

In order to make sure that the upward and downward movements of a total of four trunnions 73 of the toroidal-type continuously variable transmission T can be synchronized with each other, the upper end portions of the trunnions 73 are connected together by an upper yoke 81 and the lower end portions of the trunnions 73 are connected together by a lower yoke 82. That is, the right and left two end portions of the upper yoke 81 are pivotally supported swingably and rotatably on the upper end portions of the trunnions 73 through spherical joints 84, while the right and left two end portions of the lower yoke 82 are pivotally supported swingably and rotatably on the lower end portions of the trunnions 73 through spherical joints 86.

Pivot shafts 87 for supporting the power rollers 66 on the trunnions 73 respectively include: trunnion support portions 89 rotatably supported in blind-hole-shaped axial holes 73d, which are formed in the eccentric portions 73c of the trunnions 73, through needle bearings 88; and, power roller support portions 91 for supporting the power rollers 66 rotatably through needle bearings 90. One of the pivot shafts 87 is structured such that the trunnion support portion 89 thereof is set eccentric downwardly with respect to the power roller support portion 91 thereof, while the other pivot shafts 87 is structured such that the trunnion support portion 89 thereof is set eccentric upwardly with respect to the power roller support portion 91 thereof.

To the trunnion support portions 91 of the pivot shafts 87, there are fixed disk-shaped thrust support members 93. Between the thrust support members 93 and power rollers 66, there are interposed ball bearings 92; and, between the thrust support members 93 and the eccentric portions 73c of the trunnions 73, there are interposed thrust bearings 95. Thanks to this structure, while the loads applied to the power rollers 66 from the input disk 62 and output disk 63 are being transmitted to the eccentric portions 73c of the trunnions 73, not only the smooth rotation of the power roller 66 with respect to the pivot shafts 87 but also the smooth rotation of the thrust support members 93 with respect to the eccentric portions 73c of th e trunnions 73 can be realized.

The mutually opposing end portions of the upper and lower journal portions 73a, 73b of each trunnion 73 are connected together by a reinforcing member 96. That its, the reinforcing member 96 includes upper and lower stepped portions 96a, 96b; and, after the stepped portions 96a, 96b are mounted between the mutually opposing end portions of the upper and lower journal portions 73a, 73b of the trunnion 73, the stepped portions 96a, 96b are fastened to the journal portions 73a, 73b by bolts 97 which are respectively penetrated through the two end fixed portions 96c, 96d. In a state where the reinforcing member 96 is mounted to the trunnion 73, the two side surfaces of the power rollers 66 in the pivot shaft 87 direction thereof are held by and between the eccentric portion 73c of the trunnion 73 and reinforcing member 96. Since the reinforcing member 96 is disposed opposed to the axial end of the power roller support portion 91, with no provision of a special removal preventive member such as a clip, not only removal of the pivot shaft 87 from the axial hole 73d of the eccentric portion 73c of the trunnion 73 but also removal of the power roller 66 from the pivot shaft 87 can be prevented.

In each piston rod 76 and each trunnion 73, there are formed oil passages P1–P8, while the oil passages P5 and P6 communicate with each other through the interior portion of the needle bearing 88 supporting the pivot shaft 87. One end of the oil passage P3 is opened in the bearing portion of the inner periphery of a spherical joint 86 which supports the lower yoke 82, one end of the oil passage P5 is opened in the slide surface of the outer periphery of the spherical joint 86, one end of the oil passage P6 is opened in the slide surface of the outer periphery of a spherical joint 84 supporting the upper yoke 81, and one end of the oil passage P7 is opened in the slide surface of the inner periphery of the spherical joint 84. And, the thrust bearing 95, ball bearing 92 and needle bearing 90 are lubricated through oil passages P9–P14 which respectively branch off from the oil passages P5 and P6.

Also, the oil passages P4 and P8, which are formed in the journal portions 76a, 76b of the trunnion 76, are in communication with a pair of oil passages P15, P16 formed in the reinforcing member 96, while the pair of oil passages P15, P16 are opened toward the surface of the power roller 66. Therefore, the power roller 66 can be lubricated sufficiently with lubricating oil which is supplied from the oil passages P15, P16 and also, since the oil passages P15, P16 are opened at a position adjacent to the surface of the power roller 66, the lubricating oil can be prevented from spraying around, thereby being able to enhance the lubricating effect.

For lubrication of the input and output disks 62, 63, a closed portion formed in the leading end portion of a flexible lubricating oil pipe 98 is fixed to the upper yoke 81, whereas an opening formed in the base end portion of the lubricating oil pipe 98 is penetrated through the lower yoke 82 and is connected into an oil passage 99 formed in the oil pressure control block 74. In the middle portion of the lubricating oil pipe 98, there is formed a curved portion 98a which can prevent its interference with respect to the input shaft 13 and, on the upper and lower sides of the curved portion 98a as well as on the right and left sides thereof, there are formed a total of four lubricating oil jet-out ports 98b which are used to jet out the lubricating oil toward the input and output disks 62, 63. Therefore, the lubricating oil supplied from the base end side of the lubricating oil pipe 98 can be jetted out from the lubricating oil jet-out ports 98b, so that the surfaces of the input and output disks 62, 63 can be lubricated effectively.

Next, description will be given below of the transmission operation of the toroidal-type continuously variable transmission T having the above-mentioned structure.

Firstly, description will be given below of the transmission operation in the case of the forward running operation of a vehicle.

In the forward running operation, the shifter S is switched over to the forward running side (in FIG. 1, in the direction of an arrow mark F). Firstly, with the toroidal-type continuously variable transmission T switched over to a LOW ratio, the vehicle is started and is then accelerated until the toroidal-type continuously variable transmission T reaches an OD ratio. This running mode is referred to as a direct mode. In the direct mode, with the second clutch C2 remaining held in a non-fastened state, only the first clutch C1 is fastened. That is, in FIGS. 1 and 4, in case where the first clutch C1 is fastened, the ring gear 40 and sun gear 39 are united together and the planetary gear mechanism P is thereby locked, so that the torque of the engine E can be transmitted through the toroidal-type continuously variable transmission T and first clutch C1 to drive wheels W, W. Specifically, the torque of the engine E is transmitted in the route of crankshaft 11—damper 12—input shaft 13 of toroidal-type continuously variable transmission T—output gear 25 of toroidal-type continuously variable transmission T—double helical gear 23—first helical gear 24—second helical gear 27—sleeve 26—first clutch C1—third shaft 16—final drive gear 46—final driven gear 48—differential gear 47—drive wheels W, W, thereby causing the vehicle to run forward.

During the above operation, the rotation of the carrier 41 of the planetary gear mechanism P is transmitted in the route of sleeve 32—fourth helical gear 33—third helical gear 31—sleeve 30—shifter S—second shaft 15—clutch inner 38 of second clutch C2; and, since the second clutch C2 is held in a non-fastened state, there is no possibility that this rotation can be interfered with the clutch outer 20 of the second clutch C2 connected to the input shaft 13 through the drive sprocket 17, endless chain 19 and driven sprocket 18.

Thus, after the first clutch C1 is fastened completely, while shifting the ratio of the toroidal-type continuously variable transmission T from LOW to OD, the vehicle is accelerated. The ratio width during this is 5.8 which is a ratio of the LOW ratio (2.415) and OD ratio (0.415) of the toroidal-type continuously variable transmission T.

In case where the toroidal-type continuously variable transmission T reaches the OD ratio, the fastened state of the first clutch C1 is removed, the second clutch C2, which has been held in the non-fastened state, is fastened, and the ratio of the toroidal-type continuously variable transmission T is shifted from OD to LOW. Due to this, the ratio of the whole continuously variable transmission can be shifted to the higher ratio side than the highest ratio, that is, OD ratio of the single toroidal-type continuously variable transmission T and thus the ratio width of the direct mode, 5.8 can be extended up to 8.7. This running mode is referred to as a torque split mode.

In the torque split mode, the torque of the engine E is transmitted to the carrier 41 of the planetary gear mechanism P through the route of crankshaft 11—damper 12—input shaft 13 of toroidal-type continuously variable transmission T—drive sprocket 17—endless chain 19—driven sprocket 18—clutch outer 20 of second clutch C2—clutch inner 38 of second clutch C2—second shaft 15—shifter S—sleeve 30—third helical gear 31—fourth helical gear 33—sleeve 32. Most of the torque of the carrier 41 of the planetary gear mechanism P is transmitted in the route of ring gear 40—clutch outer 44 of first clutch C1 third shaft 16—final drive gear 46—final driven gear 48 differential gear 47—drive wheels W, W, thereby being able to drive the vehicle forward. Also, part of the torque of the carrier 41 of the planetary gear mechanism P is transmitted reversely to the input shaft 13 of the toroidal-type continuously variable transmission T in the route of sun gear 39 of planetary gear mechanism P—sleeve 26—second helical gear 27—first helical gear 24—double helical gear 23—output gear 25;

and, the torque is transmitted from the input shaft 13 to the drive wheels W, W through the above-mentioned route passing the second clutch C2.

In case where the toroidal-type continuously variable transmission T is shifted from the OD ratio side to the LOW ratio side in the torque split mode, the ratio of the whole continuously variable transmission is shifted to the further higher ratio side. The reason for this is that, in case where the toroidal-type continuously variable transmission T turns into the LOW ratio and then the number of rotations of the output gear 25 is thereby reduced, the number of rotations of the sun gear 39 of the planetary gear mechanism P is reduced and, in accordance with this, the number of rotations of the ring gear 40 of the planetary gear mechanism P connected to the drive wheels W, W is increased.

Next, description will be given below of the gear change operation in the backward running operation of the vehicle.

In the backward running operation of the vehicle, while holding the toroidal-type continuously variable transmission T in the LOW ratio, the vehicle is started. In this case, while the first clutch C1 remains held in the non-fastened state, only the second clutch C2 is fastened. That is, in FIGS. 1 and 4, in case where the second clutch C2 is fastened, the torque of the engine E is transmitted in the route of crankshaft 11—damper 12—input shaft 13 of toroidal-type continuously variable transmission T—drive sprocket 17—endless chain 19—driven sprocket 18—second clutch C2—second shaft 15—shifter S—fifth helical gear 34—seventh helical gear 36—sixth helical gear 35—third shaft 16—final drive gear 46—final driven gear 48—differential gear 47—drive wheels W, W, thereby driving the vehicle backward. During this, the rotation of the output gear 25 of the toroidal-type continuously variable transmission T is input to the sun gear 39 of the planetary gear mechanism P, is output from the carrier 41 and is transmitted to the sleeve 30 of the second shaft 15; and, since the shifter S is switched over to the backward running side, there is no possibility that the present rotation can interfere with the rotation of the second shaft 15.

By the way, while the toroidal-type continuously variable transmission T is in operation, in case where operation oil of high pressure is supplied into the oil chamber 72 formed within the cylinder 71, the left-side input disk 62, which can be slided with respect to the input shaft 13, is energized in the right direction. The energizing force of the left-side input disk 62 is transmitted through the left-side power rollers 66, centrally situated output disks 63 slidable in the axial direction with respect to the input shaft 13, and right-side power rollers 66 to the right-side input disk 62 which is formed integral with the input shaft 13. As a result of this, the power rollers 66 of the right-side first continuously variable transmission 61*a* are strongly held by and between the right-side input disk 62 and output disk 63, while the power rollers 66 of the left-side second continuously variable transmission 61*b* are strongly held by and between the left-side input disk 62 and output disk 63, so that the torque can be transmitted without causing any slippage.

At the then time, the input shaft 13 is supported on the casing-by the roller bearing 67, 68 in such a manner that it can be moved in the axial direction, and the left-side input disk 62 and central output disks 63 are all slidable with respect to the input disk 13 in the axial direction of the input disk 13; and, therefore, the power rollers 66 of the right-side first continuously variable transmission mechanism 61*a* and the power rollers 66, 66 of the left-side second continuously variable transmission mechanism 61*b* are pressed with equal pressure, which not only makes uniform the transmission characteristics of the first and second continuously variable transmission mechanisms 61*a* and 61*b* but also prevents the load of the cylinder 71 from being transmitted as a thrust force from the input shaft 13 to the casing.

Also, the output gear 25, which consists of a double helical gear formed integral with the central output disks 63, is in meshing engagement with the double helical gear 23 of the first shaft 14, while the first shaft 14 is positioned by the ball bearing 21 with respect to the casing in the axial direction thereof. Therefore, the input shaft 13 is positioned with respect to the casing in the axial direction thereof indirectly through the output disks 63, output gear 25, double helical gear 23, first shaft 14 and ball bearing 21, which can prevent the input shaft 14 from moving unexpectedly.

Further, since the input shaft 13 is not restricted in the axial direction thereof, even in case where the load from the cylinder 71 is applied, the meshingly engaged portions of the output gear 25 and double helical gear 23 are prevented from shifting, which can prevent uneven thrust forces from occurring in the meshingly engaged portions. This can prevent occurrence of a difference between the loads of the power rollers 66 of the first and second continuously variable transmission mechanisms 61*a* and 61*b*, thereby being able to keep uniform the transmission characteristics of these two continuously variable transmission mechanisms 61*a* and 61*b*.

Figure 7:
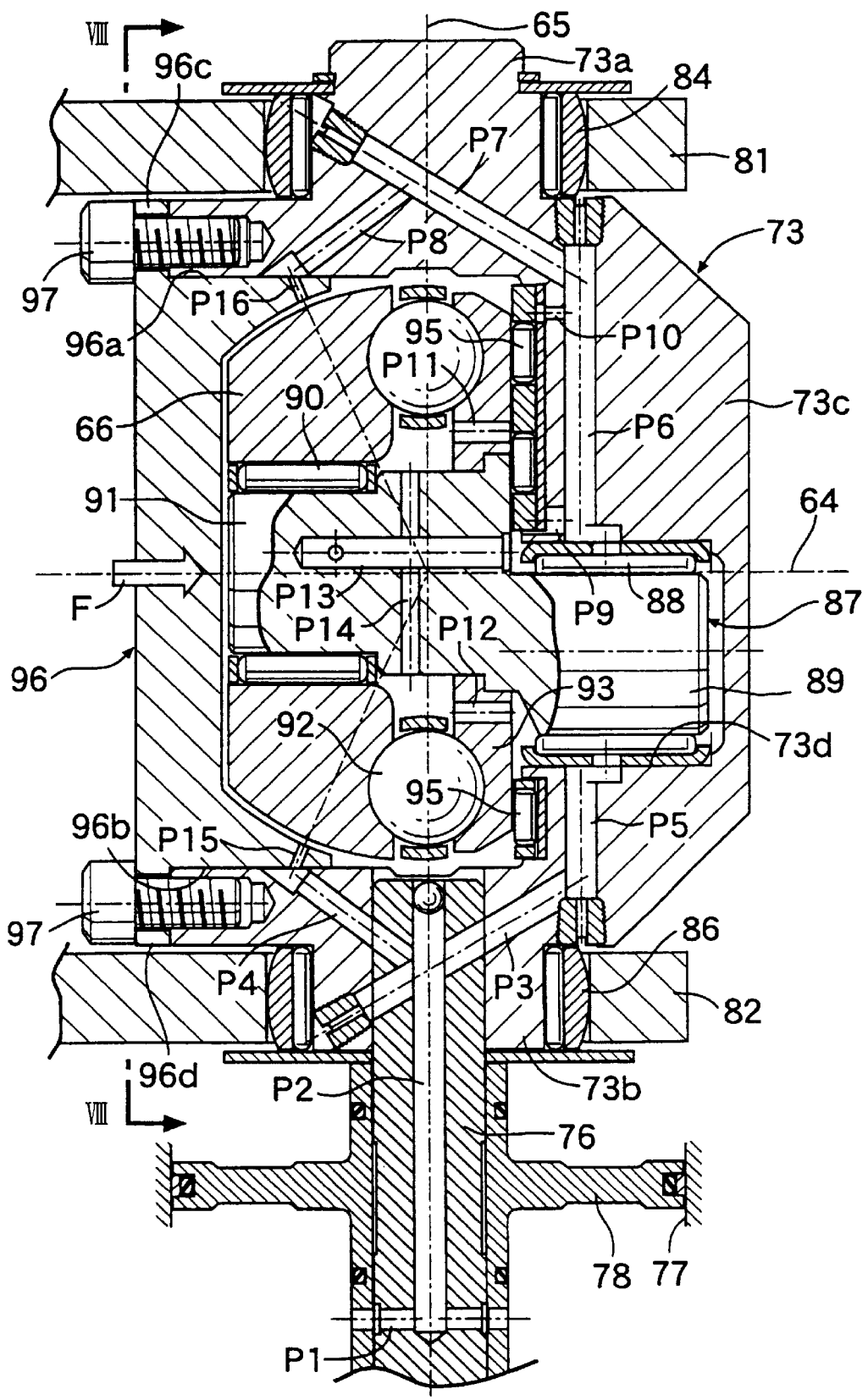
FIG. 7 is an enlarged view of the main portions of FIG. 6.
Figure 8:
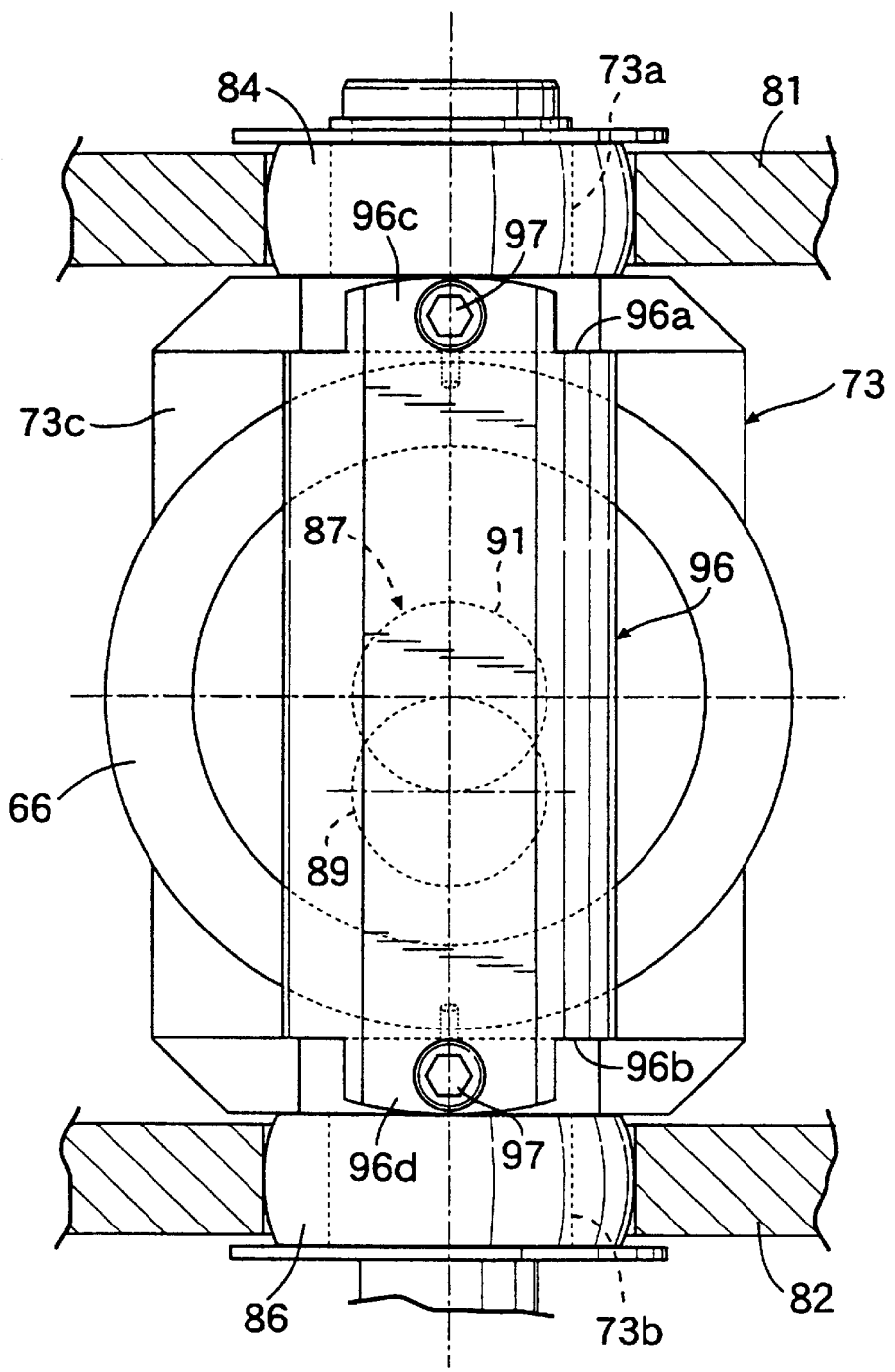
FIG. 8 is a section view taken along the direction of the VIII—VIII arrow mark shown in FIG. 7; and, FIG. 9 is an explanatory view of the deformation of a conventional trunnion.
Figure 9:
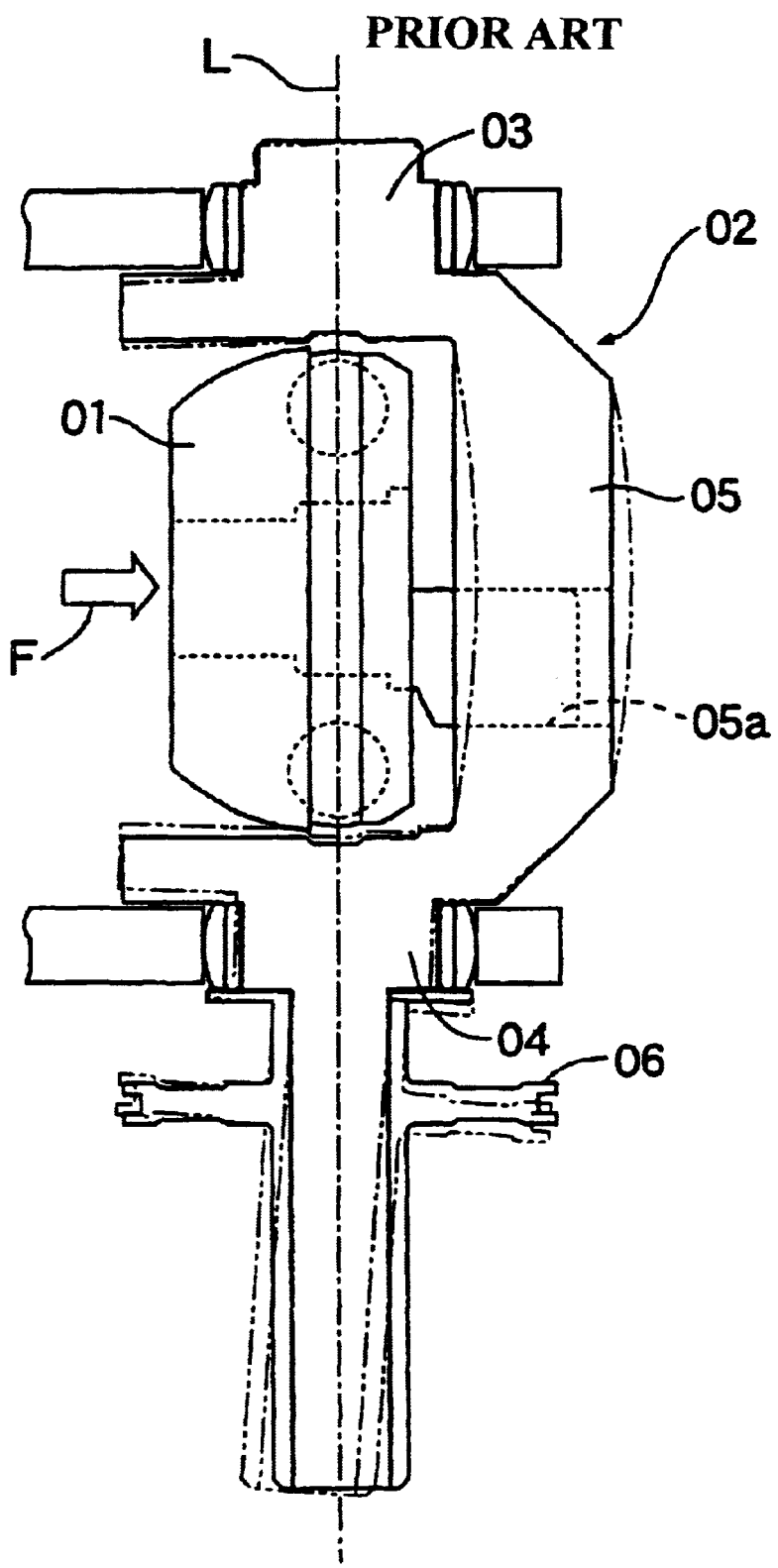

As described above, in case where the power rollers 66 of the first and second continuously variable transmission mechanisms 61*a* and 61*b* are pressed by and between the input disks 62 and output disks 63, a load, which is shown by an arrow mark F in FIG. 7, is applied to the power roller 66 to try to deform the trunnion 73. However, because the reinforcing member 76 is fixed in such a manner that it bridges the eccentric portion 73*c* (which is lowest in rigidity) of the trunnion 73, the deformation of the trunnion 73 can be controlled down to a minimum and thus the piston 78 disposed on the lower journal portion 73*b* of the trunnion 73 through the piston rod 76 can be prevented against the frictional action, which can guarantee the smooth operation of the trunnion 73.

Although description has been given heretofore in detail of the embodiment of a toroidal-type continuously variable transmission according to the invention, the invention can also be changed in design in various manners without departing from the subject matter of the invention.

For example, in the illustrated embodiment, there is shown a toroidal-type continuously variable transmission of a double-cavity type. However, the invention can also be applied to a toroidal-type continuously variable transmission of a single-cavity type. Also, in case where the reinforcing members 96, 96 are pressure inserted between the mutually opposing end portions of the journal portions 73*a*, 73*b* of the trunnions 73, when no load is applied, the trunnions 73 can be deformed in the opposite direction to the time when the load is applied. Thanks to this, the deformation of the trunnions 73 when: the load is applied thereto can be controlled further effectively.

As has been described above, according to the first aspect of the invention, since the mutually opposing end portions of a pair of journal portions of each trunnion, which are respectively formed so as to be continuous with the two ends of the eccentric portion of the trunnion, are connected together by a reinforcing member and are thereby enhanced in rigidity, even in case where a load is applied to the eccentric portion of the trunnion from the input and output disks through the power rollers, the deformation of the trunnion caused by the load can be controlled down to a minimum. This can prevent the support portion and drive portion of the trunnion against the frictional actions, so that not only the movement of the trunnion in the axial direction thereof but also the rotational movement of the trunnion around the trunnion shaft for gear change can be carried out smoothly.

Also, according to the second aspect of the invention, since the contact portions of the input and output disks and power rollers are lubricated-with lubricating oil which is supplied through oil passages formed in the reinforcing member, the input and output disks as well as the power rollers can be enhanced in durability.

What is claimed is:

1. A toroidal-type continuously variable transmission, comprising:

an input disk supported on a rotary shaft so as to be unrotatable with respect to said rotary shaft;

an output disk supported on said rotary shaft so as to be rotatable with respect to said rotary shaft;

a power roller rotatably supported on a trunnion such that said power roller is contacted with said input disk and said output disk;

said trunnion having: a pair of journal portions disposed on a trunnion shaft and spaced from each other; a U-shaped eccentric portion disposed eccentric from said trunnion shaft and having two ends integrally connected to the mutually opposing end portions of said pair of journal portions; and a pivot shaft disposed in said eccentric portion for supporting said power roller in a space defined by said eccentric portion and said mutually opposing end portions of said pair of journal portions; and, a reinforcing member connecting the mutually opposing end portions of said pair of journal portions so that said power roller is interposed between said eccentric portion of said trunnion and said reinforcing member.

2. The toroidal-type continuously variable transmission as set forth in claim 1, wherein said reinforcing member has at least one of oil passages supplying lubricating oil for lubricating the contact portions of said input disk and said output disk with said power roller.

3. The toroidal-type continuously variable transmission as set forth in claim 1, further comprising:

upper and lower yokes swingably and rotatably supporting said pair of journal portions of said trunnion; and a lubricating oil pipe connected to said upper and lower yokes, and having lubricating oil jet-out ports for jutting out the lubricating oil toward said input and output disks.

4. The toroidal-type continuously variable transmission as set forth in claim 1, wherein said trunnion is moved in the direction of said trunnion shaft and is rotated around said trunnion shaft to thereby shift the contact positions of said power roller with said input disk and said output disk for transmission.

5. The toroidal-type continuously variable transmission as set forth in claim 1, wherein said reinforcing member has curved surfaces facing with said input and output disks.

* * * * *